March 27, 1962  J. R. SEBASTIAN ETAL  3,026,817
PALLETS
Filed June 19, 1958
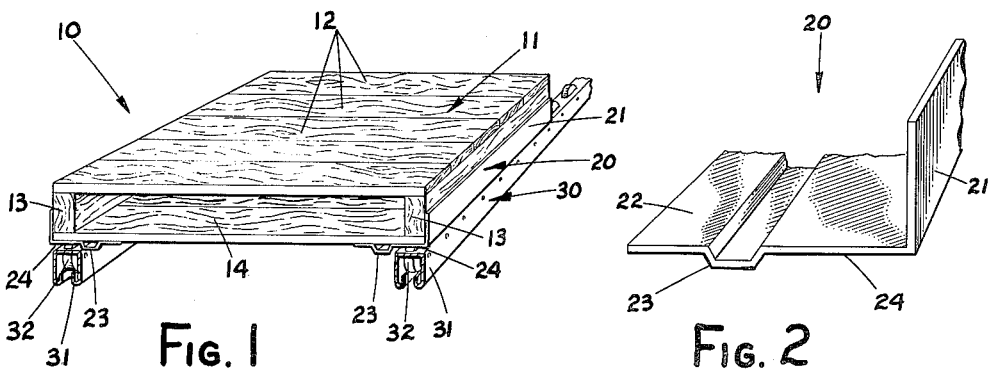
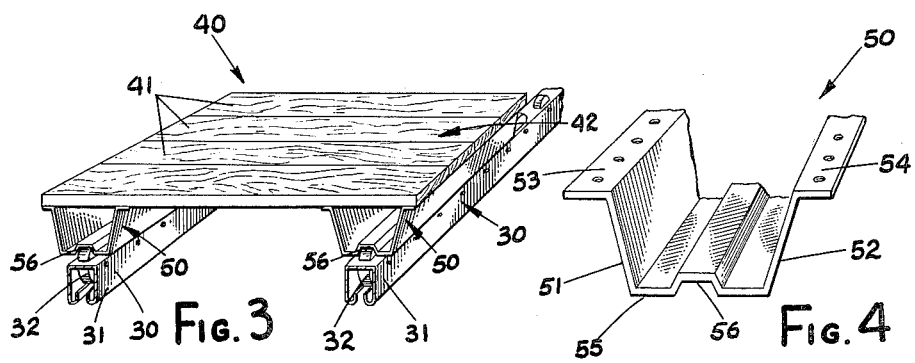
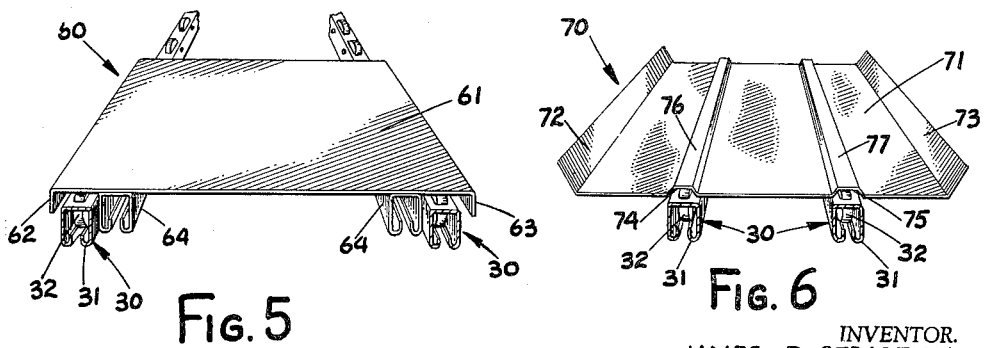
INVENTOR.
JAMES R. SEBASTIAN
CLARENCE L. FILKINS
BY
*Price and Heneveld*
ATTORNEYS United States Patent Office 3,026,817
Patented Mar. 27, 1962

3,026,817
PALLETS
James R. Sebastian and Clarence L. Filkins, Grand
Rapids, Mich., assignors to The Rapids-Standard Company, Inc., Grand Rapids, Mich., a corporation of Michigan
Filed June 19, 1958, Ser. No. 743,111
1 Claim. (Cl. 104—135)

This invention relates to load carrying pallets in general, and more particularly to load carrying pallets which are suitable for conveyor use.

Most load carrying pallets are made of rough lumber in a rather crude and inexpensive manner. The principal object of a pallet is generally accepted as a means of supporting a heavy load to enable it to be more easily transported from one place to another. Consequently it is made strong and sturdy but otherwise as inexpensively as possible.

One problem in using pallets is the storage of loaded pallets. The pallets and their loads cannot always be stacked one on top of another. Also, even though the pallets and their loads may be lifted up and placed in storage racks, only the front part of the storage racks can be used. When the palleted loads are stored two or more deep the back pallets are usually inaccessible.

This storage problem has been greatly improved by the use of a form of short gravity feed conveyor at each storage bin. This is most inexpensively accomplished in using parallel spaced lengths of wheeled conveyor rails or tracks. Such storage facilities are becoming more and more commonly accepted.

Unfortunately the commonly known form of pallet, made of rough and inexpensive lumber, is not readily adapted for use with the newer storage facilities. This applies also to conveyor means which make use of the wheeled track sections; particularly with gravity feed operations. The rough under surface of the conventionally known pallet does not lend itself as well to travel on conveyor wheels as would be a smoother under surface. Furthermore, some form of guide means for travel on wheeled conveyor track sections is highly desirable.

It is an object of this invention to disclose several different, though common, forms of pallets for use with wheeled conveyor means. Each of the pallets disclosed is most inexpensive to manufacture and is of strong and sturdy construction. The pallets disclosed also include a generally similar form of guide means for better conveyor wheel engagement and to prevent inadvertent disengagement of the pallet from the conveyor tracks.

It is also an object of this invention to disclose means by which the conventionally known type of pallet may be inexpensively adapted for conveyor track service.

A further object of this invention is to disclose a means by which simple pallets may be made and will include means for guided conveyor track service.

These and other objects and advantages in the practice of this invention will be more apparent in the description and illustration of working embodiments thereof as hereinafter set forth.

In the drawings:

FIG. 1 is a perspective view of a conventionally known type of pallet adapted for use with wheeled conveyor track sections.

FIG. 2 is a perspective view of a part of the angular member used in adapting the pallet of FIG. 1 for conveyor track use.

FIG. 3 is a perspective view of a simplified form of load carrying pallet with structural guide rails.

FIG. 4 is a perspective view of a part of one of the structural guide rails used with the pallet of FIG. 3.

FIG. 5 is a perspective view of another form of conveyor track pallet.

FIG. 6 is a perspective view of a form of pallet pan including the principles of this invention.

A form of conventionally known pallet 10 is shown by FIG. 1. This pallet includes a load carrying platform surface 11 which is provided by several slats or boards 12 disposed in parallel side by side relation. Two by four members, or the like, 13 are disposed in parallel spaced relation to each other transversely of the platform forming slats 12. A lower platform surface 14 is secured to the transversely disposed members 13. This normally makes the pallet reversible so that either side can be used.

In adapting the conventionally known pallet 10 for use with conveyor track sections, angular members 20 are secured to its lower side edges. The angular members 20 extend the full length of the pallet 10. They include a vertically disposed flange 21 which is engaged to the side wall of the pallet. They also include a horizontally disposed flange 22 which is secured to the underside of the pallet. The flange 22 is formed to include a guide ridge 23. The guide ridge is in the form of a channel bead and extends the full length of the pallet. The guide ridge 23 serves to provide an open channel recess 24 at the outer edge of the pallet and on each side thereof.

The pallet 10, as adapted to include the angular members 20, is readily received upon parallel spaced lengths of conveyor flow tracks 30. The flow tracks include rail members 31 having a plurality of conveyor wheels 32 mounted thereon. The conveyor wheels are received in engagement with the flange 22 of the angular members within the area previously described as the open channel recess 24.

A pallet form 40 is shown by FIG. 3. This pallet includes several boards or slats 41 disposed in parallel side by side relation to provide a load bearing platform 42. The boards or slats 41 are secured together by structural members 50 which extend transversely thereof and are disposed on their underside. The structural members 50 have the boards 41 secured to them in forming the platform surface 42.

The structural members 50 include channel shaped members disposed in parallel spaced relation to each other and having their open side closed against the bottom of the load bearing platform 42. The channel members are reasonably deep to form legs for the load bearing platform surface 42. The channel shaped structural members 50 include depending side flanges 51 and 52. Securing flanges 53 and 54 are provided on the upper ends of the side wall flanges. These are used in securing the channel shaped member to the load bearing platform 42. The channel web 55 is formed to include a shallow channel recess 56 therein.

The pallet 40 is adapted for use with parallel spaced lengths of conveyor flow tracks 30 which are provided by the rails 31 and include a plurality of conveyor wheels 32. The conveyor wheels 32 are received within the shallow recess 56 of the structural channel members. Accordingly, the pallet 40 is guided for movement on the flow tracks 30 and is protected against inadvertent lateral movement which might dislodge it from the conveyor tracks.

The pallet form 60 shown by FIG. 5 is made from a plate member 61. The plate member has its side edges formed to include depending flanges 62 and 63. The rolled form of conveyor track rail 64 may be secured to the under surface of the pallet plate 61 in parallel spaced relation to the depending flanges 62 and 63. This forms a channel recess between the rails 64 and the flanges wherein the wheeled members 32 of the flow tracks 30 may be received.

In FIG. 6 there is disclosed a pallet pan 70. The pan is formed from a plate member 71. The side edges of the plate are bent upwardly to form side flanges 72 and 73. Shallow channel grooves 74 and 75 are formed in the under surface of the pallet pan 70. This also provides structural ribs 76 and 77 on the load bearing surface of the pan.

The conveyor wheels 32 of flow tracks 30 are readily received within the channel grooves 34 and 35 for guiding the pan thereon.

While a preferred embodiment of this invention has been described, it will be understood that other modifications and improvements may be made thereto. Such of these modifications and improvements as incorporate the principles of this invention are to be considered as included in the hereinafter appended claim unless this claim by its language expressly states otherwise.

We claim:

A load carrying pallet, comprising; a pallet member having a load bearing surface, elongated angular unitary members secured to the sides of said pallet and including a flange extending thereunder, a ridge guide formed on said flanges, said flanges extending the length of said pallet to provide a guide wheel receptive surface, and said ridges serving to prevent lateral shifting of said pallet as received on suitable guiding wheel means.

References Cited in the file of this patent

UNITED STATES PATENTS

| | | |
|---|---|---|
| 310,929 | Baldwing | Jan. 20, 1885 |
| 449,126 | Little | Mar. 31, 1891 |
| 1,497,754 | Howard | June 17, 1924 |
| 1,751,717 | Romine | Mar. 25, 1930 |
| 2,455,197 | Sullivan | Nov. 30, 1948 |
| 2,544,743 | Vrabcak | Mar. 13, 1951 |
| 2,615,661 | Cushman | Oct. 28, 1952 |
| 2,634,931 | Weitzel | Apr. 14, 1953 |
| 2,652,785 | Cox | Sept. 22, 1953 |

FOREIGN PATENTS

| | | |
|---|---|---|
| 146,867 | Germany | Dec. 22, 1903 |